(12) United States Patent
Denman et al.

(10) Patent No.: US 11,213,897 B2
(45) Date of Patent: Jan. 4, 2022

(54) METHOD OF ASSEMBLING MEMBERS OF AN ASSEMBLY

(71) Applicant: The Boeing Company, Chicago, IL (US)

(72) Inventors: Mark Steven Denman, Poulsbo, WA (US); Stephen Richard Dark, Lynnwood, WA (US); Gary A. Lipczynski, Garden Grove, CA (US)

(73) Assignee: THE BOEING COMPANY, Chicago, IL (US)

(*) Notice: Subject to any disclaimer, the term of this patent is extended or adjusted under 35 U.S.C. 154(b) by 55 days.

(21) Appl. No.: 16/423,610

(22) Filed: May 28, 2019

(65) Prior Publication Data
US 2020/0376613 A1 Dec. 3, 2020

(51) Int. Cl.
*B23B 35/00* (2006.01)
*B64F 5/10* (2017.01)
*F16B 5/02* (2006.01)
*F16B 5/04* (2006.01)
*B23B 41/00* (2006.01)

(52) U.S. Cl.
CPC .............. *B23B 41/00* (2013.01); *B23B 35/00* (2013.01); *B23B 2215/04* (2013.01); *B23B 2220/04* (2013.01); *B64F 5/10* (2017.01); *F16B 5/02* (2013.01); *F16B 5/04* (2013.01)

(58) Field of Classification Search
CPC ......... B23P 15/16; B23B 35/00; B23B 41/00; B23B 2215/04; B23B 2220/04; B23B 35/005; B64F 5/10; F16B 5/02; F16B 5/04
See application file for complete search history.

(56) References Cited

U.S. PATENT DOCUMENTS

| 4,800,686 A | 1/1989 | Hirabayashi et al. |
| 4,984,347 A | 1/1991 | Cox |
| 5,265,988 A | 11/1993 | Schmigalla et al. |

(Continued)

FOREIGN PATENT DOCUMENTS

| DE | 102011122539 A1 | 6/2013 |
| EP | 3208017 A1 | 8/2017 |

(Continued)

OTHER PUBLICATIONS

Extended European Search Report for Application No. EP20169545.9 dated Oct. 16, 2020, 9 pgs.

*Primary Examiner* — Matthew P Travers
(74) *Attorney, Agent, or Firm* — Armstrong Teasdale LLP

(57) ABSTRACT

A method of assembling an aircraft assembly having a first member and a second member includes drilling at least one first opening through the first member, the at least one opening having a first diameter, and drilling at least one second opening through the second member, the at least one second opening having the first diameter. The method also includes forming a chamfer on the at least one first opening and the at least one second opening, the chamfer having a chamfer diameter, and positioning the first and second members to align the at least one first opening and the at least one second opening. The method further includes drilling the at least one first opening and the at least one second opening to a second diameter, wherein the second diameter is greater than the first diameter.

20 Claims, 6 Drawing Sheets

(56) References Cited

U.S. PATENT DOCUMENTS

| | | | |
|---|---|---|---|
| 6,370,752 B1 * | 4/2002 | Anderson | F01D 5/186 |
| | | | 29/402.11 |
| 7,627,940 B2 | 12/2009 | Amirehteshami et al. | |
| 7,794,183 B2 | 9/2010 | Wright et al. | |
| 10,105,765 B2 | 10/2018 | Struder | |
| 2005/0288890 A1 * | 12/2005 | Hollingshead | G01B 21/04 |
| | | | 702/155 |
| 2020/0191182 A1 * | 6/2020 | Bouriquet | B21D 39/00 |
| 2020/0400171 A1 * | 12/2020 | Hashizume | F16B 5/0642 |

FOREIGN PATENT DOCUMENTS

| | | |
|---|---|---|
| JP | 2000288813 A | 10/2000 |
| JP | 2010247281 A | 11/2010 |

* cited by examiner

METHOD OF ASSEMBLING MEMBERS OF AN ASSEMBLY

FIELD

The following disclosure relates generally to assembly of aircraft structures, and, more particularly, a method of assembling aircraft.

BACKGROUND

At least some known aircraft include rigid structure pylons that hold an engine in position under the aircraft's wing. Due to the weight of the engine, large fasteners are typically used to attach the pylon to the wing and to the engine nacelle, When attaching the pylon, it is important that the fastener openings are adequately aligned. In order to ensure alignment, in at least some known process, the structures to receive a fastener are assembled together and a single hole is drilled through the stack of assembled components.

However, as the drill exits each component in the stack, it may produce burrs between the adjacent components. The buildup of burrs between adjacent layers of the assembly stack up may cause stress points and may decrease the overall service life of the components. As such, at least some known assembly methods disassemble the stack of components after drilling in order to manually de-burr the drilled openings and form chamfers at each opening to facilitate fastener insertion. Disassembly and manual de-burring of the aircraft components results in relatively high manufacturing costs and long manufacturing time.

BRIEF DESCRIPTION

In one example, a method of assembling an aircraft assembly including a first member and a second member is provided. The method includes drilling at least one first opening through the first member, the at least one opening having a first diameter, and drilling at least one second opening through the second member, the at least one second opening having the first diameter. The method also includes forming a chamfer on the at least one first opening and the at least one second opening, the chamfer having a chamfer diameter, and positioning the first and second members to align the at least one first opening and the at least one second opening. The method further includes drilling the at least one first opening and the at least one second opening to a second diameter, wherein the second diameter is greater than the first diameter.

In yet another example, a method of forming chamfered holes in assembled members is provided. The method includes drilling at least one opening through a first member of the assembled members, wherein the at least one opening is drilled at a first diameter. The method also includes forming a chamfer about the at least one opening, wherein the chamfer is formed at a chamfer diameter. The first member is then positioned in alignment with a mating second member, wherein the first member and the mating second member are to be assembled. The method further includes drilling the at least one opening in the first member and drilling the second member such that the at least one opening includes a second diameter greater than the first diameter.

The features, functions, and advantages that have been discussed can be achieved independently in various examples of the present disclosure or may be combined in yet other examples, further details of which can be seen with reference to the following description and drawings.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

The implementations described herein relate to a method of assembling an assembly of members, and, more particularly, to methods of forming chamfers and aligning members of an assembly. More specifically, in the exemplary implementation, the method includes drilling a plurality of openings through each member of an assembly, where each opening includes a first diameter. A chamfer is then formed at both ends of each opening and the members are positioned to align their respective openings using determinate assembly features that align the members within a predetermined tolerance limit. The method further includes drilling through each of the aligned openings at a second diameter that is larger than the first diameter. As described herein, the chamfers are formed at a diameter larger than the second diameter and the predetermined tolerance limit of the determinate assembly features is less than the difference between the chamfer diameter and the second diameter to ensure that the chamfers survive the second drilling step. Accordingly, the determinate assembly features facilitate aligning the chamfers of the assembly members such that any deviation in alignment is within the predetermined tolerance limit and is small enough to fall within the chamfer diameter.

Forming the chamfers at the chamfer diameter on the openings prior to drilling the openings to the final, desired size at the second diameter allows for the second drilling step to occur within the chamfer and not at a sharp corner between the openings and a horizontal surface of the members. As such, the chamfers "break" the corners of the openings to reduce or prevent the formation of burrs between the assembly members and therefore prevent the need to disassemble the first and second members after the final diameter is drilled to de-burr the openings. Elimination of the disassembly and de-burring steps significantly reduces manufacturing time and provides for costs savings.

Figure 1:
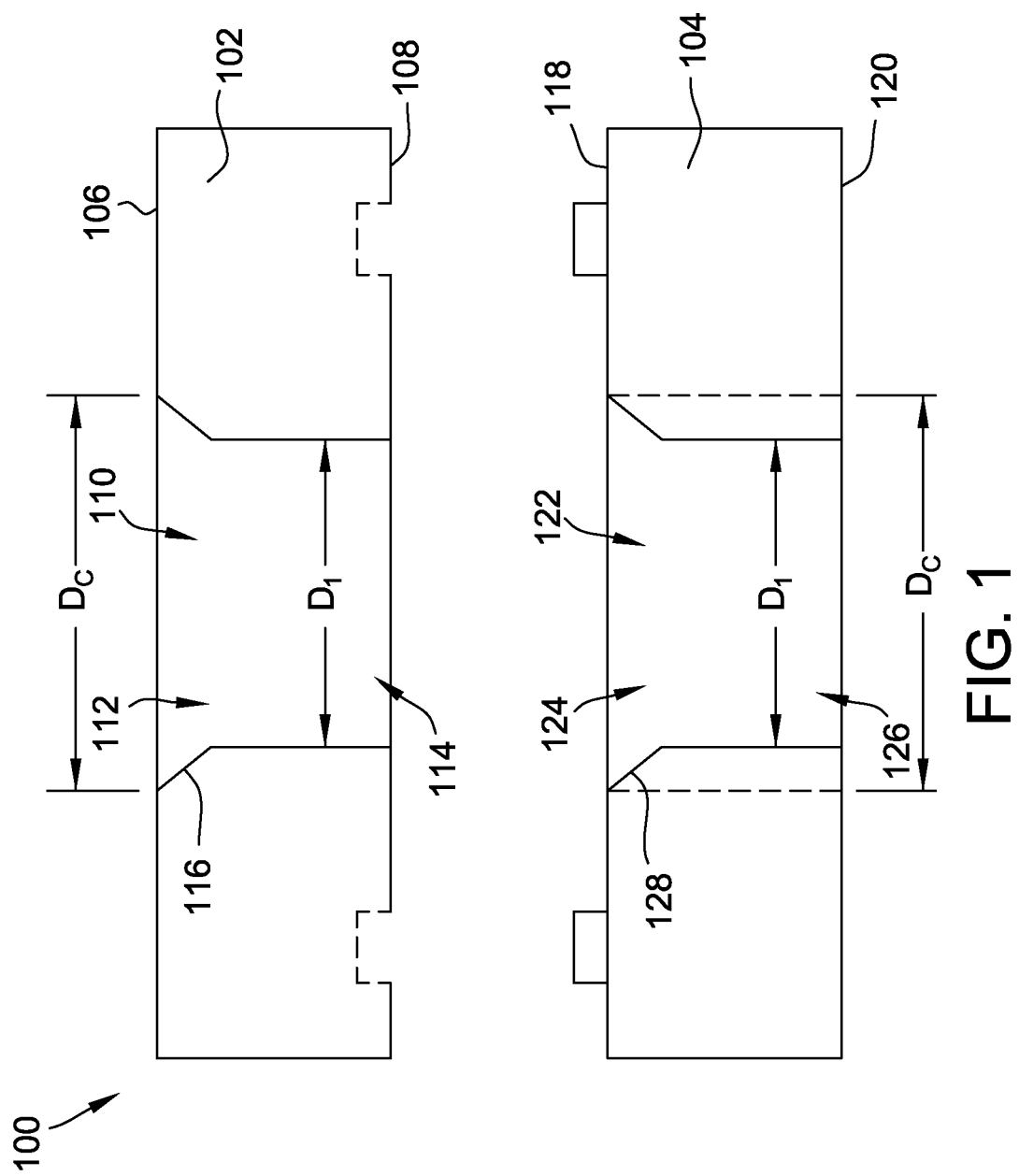
FIG. 1 is a cross-sectional view of a pair of structural components during an exemplary method of assembly illustrating an initial drilling step of the method.

FIG. 1 is a cross-sectional view of an assembly 100 including a first member 102 and a second member 104 at an initial drilling step of a method of assembling the assembly 100. Although assembly 100 is illustrated herein as having only first and second members 102 and 104, assembly 100 may include any number of members assembled together as described herein with respect to first and second members 102 and 104. In one implementation, first member 102 includes an exterior surface 106 and an opposing mating surface 108 configured to mate with second member 104. First member 102 also includes a first opening 110, having a first diameter D1, drilled through first member 102 and extending between exterior surface 106 and mating surface 108. More specifically, first opening 110 includes a first end 112 proximate exterior surface 106 and a second end 114 proximate mating surface 108. Furthermore, first member 102 also includes a first chamfer 116, having a chamfer diameter $D_c$, formed in exterior surface 106 at first end 112 of first opening 110. In one implementation, first chamfer 116 is formed simultaneously when first opening 110 is drilled. In another implementation, first chamfer 116 is formed after drilling first opening 110 through first member 102.

Similarly, second member 104 includes a mating surface 118 configured to mate with first member 102 and an opposing exterior surface 120. Second member 104 also includes a second opening 122, having a first diameter D1, drilled through second member 104 and extending between mating surface 118 and exterior surface 120. More specifically, second opening 122 includes a first end 124 proximate mating surface 118 and a second end 126 proximate exterior surface 120. Furthermore, second member 104 also includes a first chamfer 128, having a chamfer diameter $D_c$, formed in mating surface 118 at first end 124 of first opening 122. In one implementation, first chamfer 128 is formed simultaneously when second opening 122 is drilled. In another implementation, first chamfer 128 is formed after drilling second opening 122 through second member 104.

Figure 2:
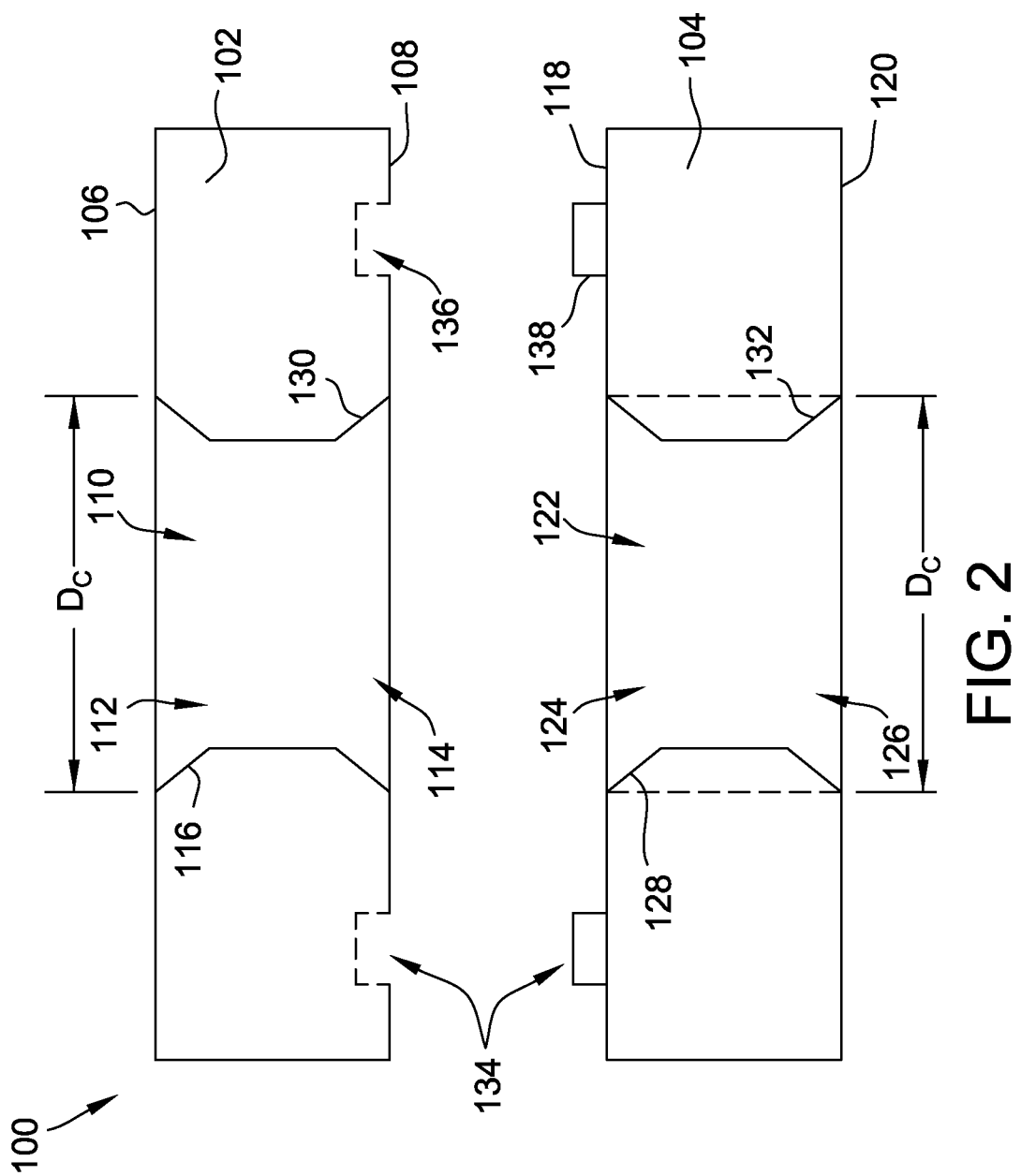
FIG. 2 is a cross-sectional view of the pair of structural components during the method of assembly illustrating a chamfering step of the method.

FIG. 2 is a cross-sectional view of first member 102 and second member 104 illustrating a chamfering step of the method of assembly. In the implementation, first member 102 includes a second chamfer 130 formed in mating surface 108. Second chamfer 130 includes the same chamfer diameter $D_c$ as first chamfer 116. Specifically, second chamfer 130 is formed at second end 114 of first opening 110 such that both first and second ends 112 and 114 each include a respective chamfer 116 and 130 at first opening 110.

Similarly, second member 104 includes a second chamfer 132 formed in exterior surface 120. Second chamfer 132 includes the same chamfer diameter $D_c$ as first chamfer 128. Specifically, second chamfer 132 is formed at second end 126 of second opening 122 such that both ends 124 and 126 each include a respective chamfer 128 and 132 at second opening 122.

Figure 3:
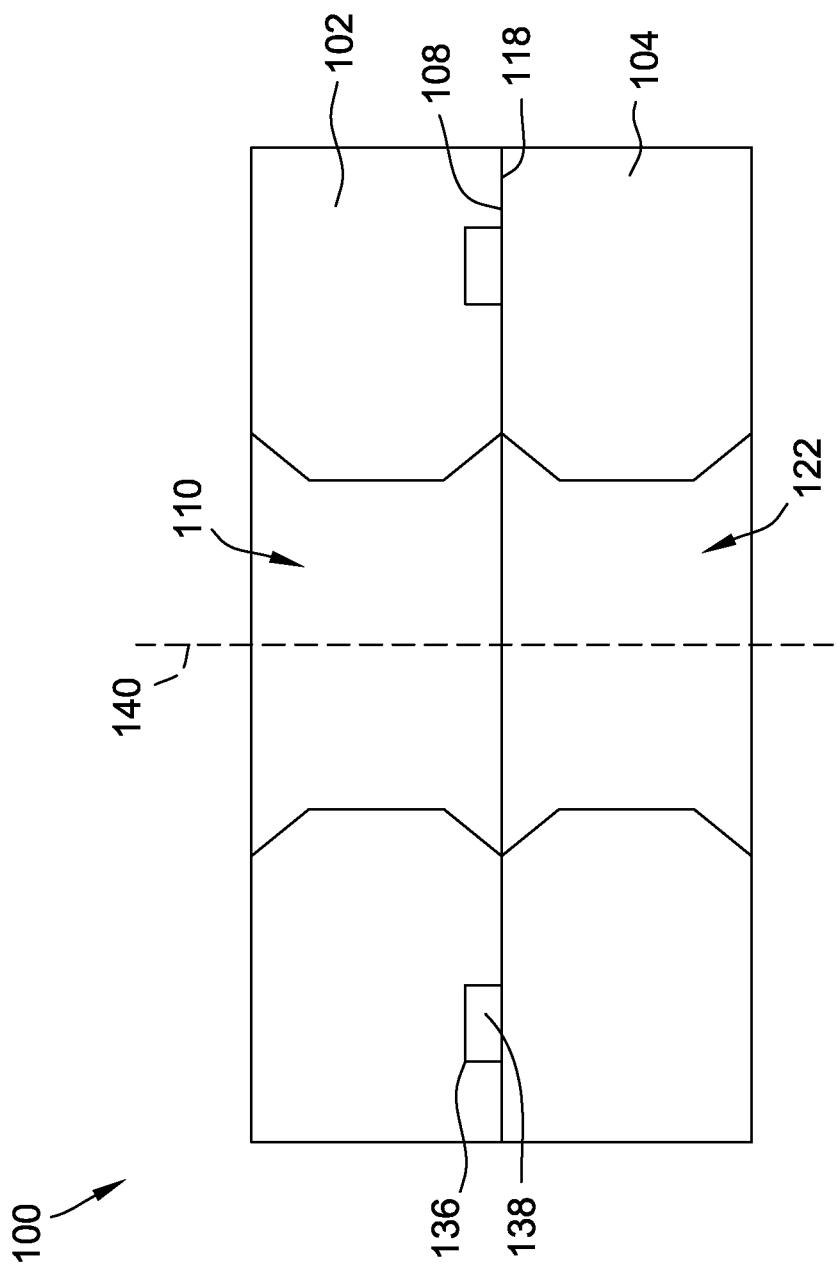
FIG. 3 is a cross-sectional view of the pair of structural components during the method of assembly illustrating an aligning step of the method.

FIG. 3 is a cross-sectional view of first member 102 and second member 104 illustrating a positioning step of the method of assembly. Specifically, first member 102 and second member 104 each include a plurality of determinate assembly features 134 (shown in FIG. 2) integrally formed with first member 102 and second member 104. More specifically, in one implementation, first member 102 includes a plurality of determinate assembly recesses 136 (shown in FIG. 2), and second member 104 includes a plurality of determinate assembly projections 138 (shown in FIG. 2). In another implementation, first member 102 includes determinate assembly projections 138 and second member 104 includes determinate assembly recesses 136. In yet another implementation, first and second members 102 and 104 each include both determinate assembly recesses 136 and determinate assembly projections 138 that correspond to the determinate assembly feature 134 on the opposing member.

As shown in FIG. 3, mating surfaces 108 and 118 are positioned in contact with each other such that determinate assembly recesses 136 on first member 102 receive determinate assembly projections 138 on second member 104. In such a configuration, determinate assembly features 134 facilitate aligning first opening 110 of first member 102 with second opening 122 of second member 104 along a common centerline 140. In the implementation, determinate assembly features 134 are used to align first member 102 and second member 104 without using external tooling elements. More specifically, determinate assembly features 134 allow for first member 102 to be placed on second member 104 without using any external guides or frame that would then be removed from assembly 100. Additionally, determinate assembly features 134 facilitate positioning the first and second members 102 and 104 relative to each other within a predetermined tolerance limit, as described in further detail herein.

Figure 4:
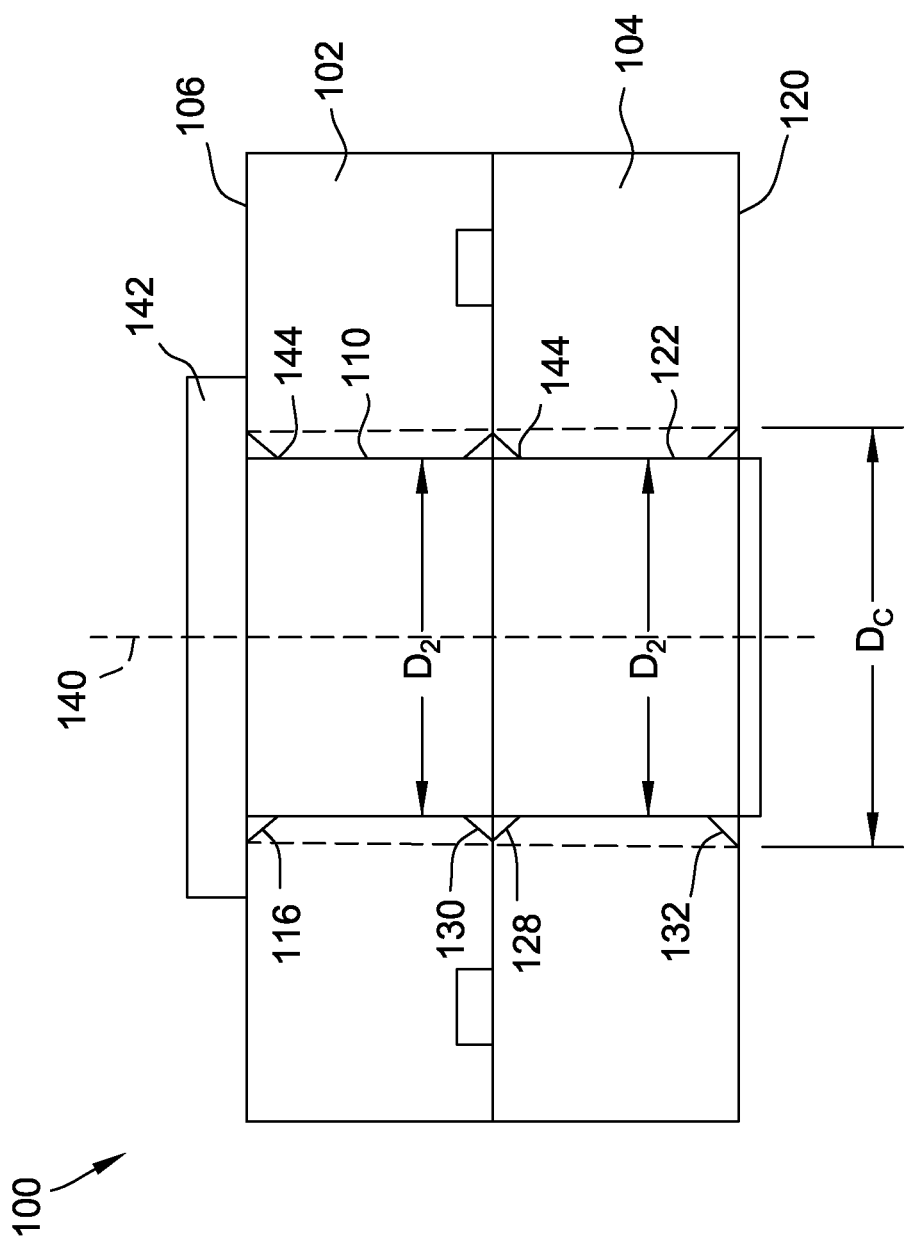
FIG. 4 is a cross-sectional view of the pair of structural components during the method of assembly illustrating a subsequent drilling step of the method.

FIG. 4 is a cross-sectional view of first member 102 and second member 104 illustrating a drilling step of the method of assembly. When first member 102 and second member 104 have been assembled together such that first opening 110 and second opening 122 are aligned, first chamfer 116 is drilled out to increase the common diameter of first opening 110 and second opening 122 to a second diameter D2. In the implementation, second diameter D2 is greater than first diameter D1. Furthermore, as shown in FIG. 4, chamfer diameter $D_c$ is greater than second diameter D2.

Figure 5:
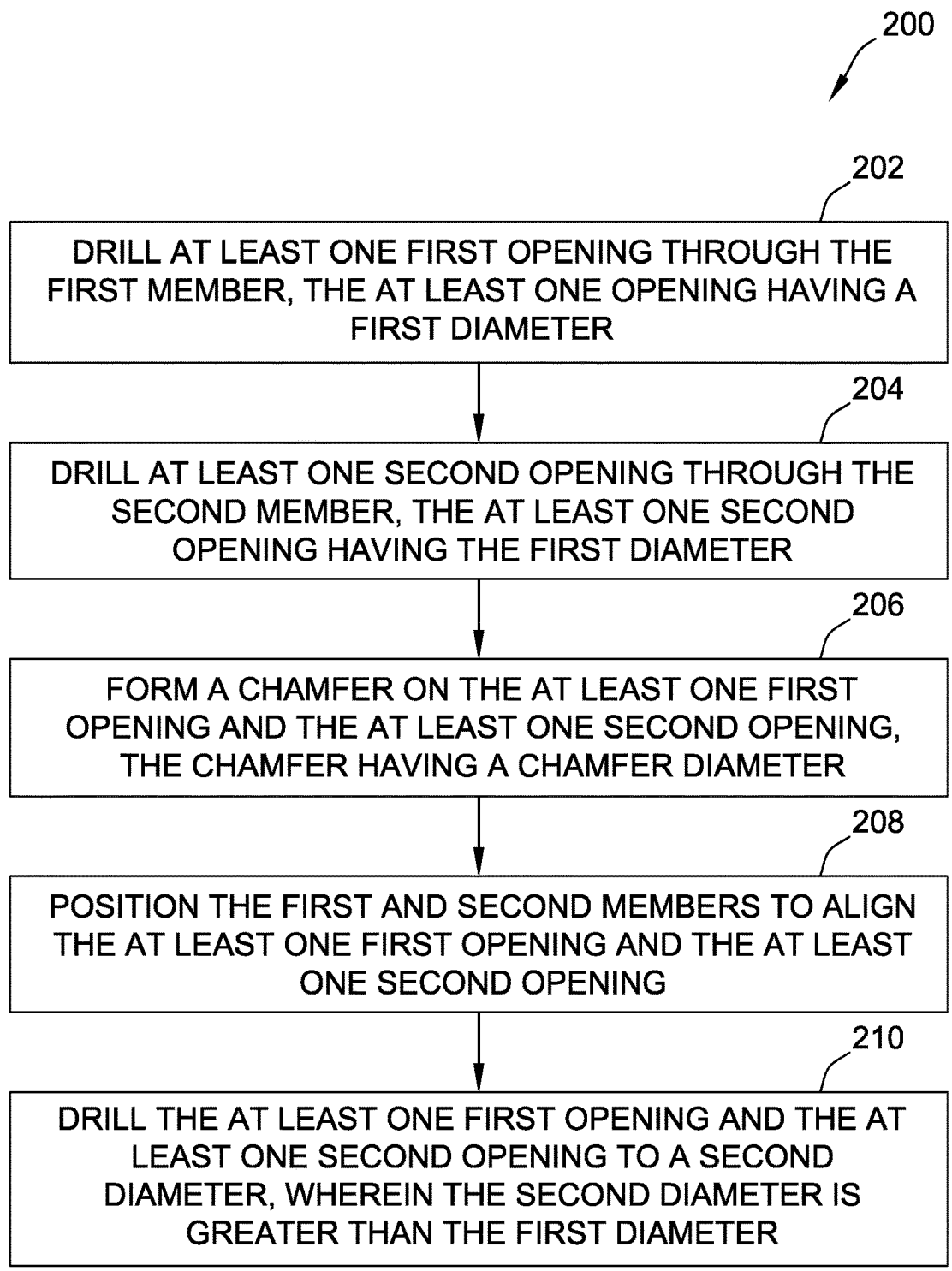
FIG. 5 is a process flow diagram of a method of assembling an aircraft assembly.

FIG. 5 is a process flow diagram of a method 200 of assembling an assembly, such as assembly 100. Method 200 includes drilling 202 at least one first opening, such as first opening 110, through a first member, such as first member 102, such that the at least one first opening includes a first diameter, such as first diameter D1. Method 200 also includes drilling 204 at least one second opening, such as second opening 122, through a second member, such as second member 104 such that the at least one second opening also includes the first diameter. Method 200 further includes forming 206 a chamfer, such as first chamfers 116 and 128, on the at least one first opening 110 and the at least one second opening 122. Each chamfer is formed 206 with a chamfer diameter, such as chamfer diameter $D_c$. In one implementation, forming 206 the chamfer includes forming a chamfer on both opposing ends of each of the at least one first opening and the at least one second opening. For example, method 200 includes forming first chamfers 116 and 128 at first ends 112 and 124 of respective first and second openings 110 and 122.

Furthermore, forming 206 a chamfer includes forming the chamfers at first ends of respective first and second openings simultaneously when drilling the at least one first opening and the at least one second opening at the first diameter. Additionally, forming 206 a chamfer includes forming 206 chamfers, such as second chamfers 130 and 132 at second ends, such as second ends 114 and 126 of respective first and second openings. For example, second chamfers 130 and 132 are formed after forming the first chamfers 116 and 128 at the first ends 112 and 124 of the at least one first opening 110 and the at least one second opening 122.

Method 200 also includes positioning 208 the first and second members 102 and 104 to align the at least one first opening 110 and the at least one second opening 122. The positioning step 208 includes positioning the first and second members 102 and 104 relative to each other within a predetermined tolerance limit. As described herein, each of the first and second members 102 and 104 includes a plurality of determinate assembly features 134 integrally formed therewith that align the first opening 110 with the second opening 122 along the centerline 140 without using external tooling elements. Specifically, mating surfaces 108 and 118 are positioned 208 in contact with each other such that determinate assembly recesses 136 on first member 102 receive determinate assembly projections 138 on second member 104. As such, determinate assembly features 134 allow for first member 102 to be positioned 208 on second member 104 without using any external guides or frame that would then need be removed from assembly 100.

In the exemplary implementation, drilling 202 the at least one first opening and drilling 204 the at least one second opening at the first diameter D1 is performed before the positioning step 208, and forming 206 the chamfers on the at least one first opening and the at least one second opening is performed before the positioning step 208.

Method 200 further includes drilling 210 the at least one first opening 110 and the at least one second opening 122 to a second diameter, such as second diameter D2, that is greater than the first diameter. In one implementation, the second diameter is the final desired size of the first and second openings and will receive a fastener, such as fastener 142, therethrough. The determinate assembly features on the first and second members facilitate aligning the first and second openings within a predetermined tolerance limit to ensure the chamfers survive the second drilling step 210. Specifically, the chamfers are formed at a chamfer diameter that is greater than the second diameter such that the chamfers are formed 206 for the final desired size of the first and second openings. Further, the predetermined tolerance limit of the determinate assembly features is less than the difference between the chamfer diameter and the second diameter. As such, even at the predetermined tolerance limit of the determine assembly features, the first and second openings at the second diameter are contained with the chamfer diameters. Accordingly, at least a portion of the chamfers on the first and second members remain in place after drilling 210 the first and second openings to the second diameter. The method 200 also includes using a brush hone that has an associated diameter that is at least the second diameter, where the brush hone is used after drilling 201 too smooth the edges, such as edges 144, defined between the chamfers and the at least one first opening after drilling 210 the at least one first opening to the second diameter. The determinate assembly features facilitate aligning the chamfers of the first and second members such that any deviation in alignment is within the predetermined tolerance limit and is small enough to fall within the chamfer diameter.

In the implementation, the chamfers are formed 206 when the first and second openings are at the first diameter such that the chamfers are already in place when the first and second openings are drilled 210 to the second diameter. Forming 206 the chamfers at the chamfer diameter on the openings prior to drilling 210 the openings to the final, desired size at the second diameter allows for the drilling step 210 to occur within the chamfer and not at a sharp corner between the opening and a horizontal surface of the members. The chamfers "break" the corners of the openings to reduce or prevent the formation of burrs between the first and second members and therefore prevent the need to disassemble the first and second members after the final diameter is drilled to de-burr the openings.

In one implementation, method 200 also includes using a brush hone technique to smooth the edges, such as edges 144, defined between the chamfers and the at least one first opening after drilling 210 the at least one first opening to the second diameter. Similarly, method 200 also includes smoothing the edges defined between the chamfers and the at least one second opening after drilling 210 the at least one second opening to the second diameter. Additionally, method 200 includes installing a fastener, such as fastener 142, through the at least one first opening and the at least one second opening to secure the first member to the second member. The fastener is not limited to the type shown in FIG. 4 and may be any fastener type that facilitates operation of assembly 100 as described herein.

Figure 6:
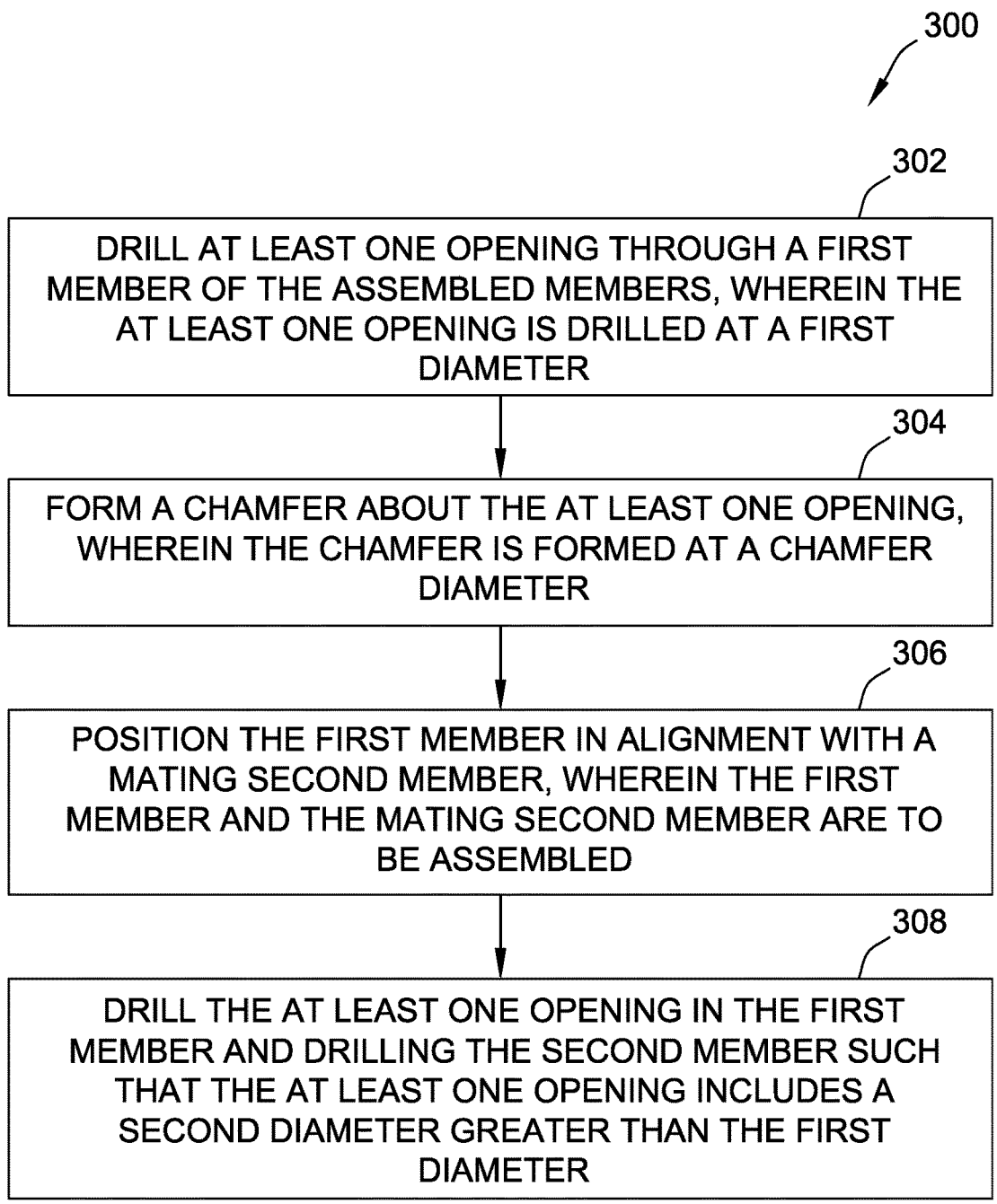
FIG. 6 is a process flow diagram of a method of forming chamfered holes in assembled members.

FIG. 6 is a process flow diagram of a method 300 of forming chamfered holes in an assembly, such as assembly 100. Method 300 includes drilling 302 at least one opening, such as first opening 110, through a first member, such as first member 102, of the assembly such that the at least one opening includes a first diameter, such as first diameter D1. Method 300 also includes forming 304 a chamfer, such as first chamfers 116 and 128, about the at least one opening. Each chamfer is formed 304 with a chamfer diameter. Such as chamfer diameter $D_c$. In one implementation, forming 304 the chamfer includes forming the chamfer on both opposing ends of the at least one opening. For example, method 300 includes forming 304 the first chamfer 116 at first end 112 of the first opening 110 and forming 304 the second chamfer 130 at the second end 114 of the first opening 110.

Method 200 also includes positioning 306 the first member in alignment with a mating second member, such as second member 104, that is to be assembled with the first member. Positioning 306 includes positioning 306 the first member and the mating second member relative to each other using a plurality of determinate assembly features, such as determinate assembly features 134, that are integrally formed on the first member and the mating second member. Furthermore, positioning 306 includes positioning 306 the first member and the mating second member relative to each other within a predetermined tolerance limit. Specifically, the determinate assembly features facilitate positioning 306 the first member and the mating second member relative to each other within a predetermined tolerance limit.

In the exemplary implementation, drilling 302 the at least one opening is performed before the positioning step 208, and forming 304 the chamfer on the at least one opening is performed before the positioning step 306.

Method 300 further includes drilling 308 the at least one opening in the first member and drilling the mating second member such that the opening includes a second diameter D2 that is greater than the first diameter D1. Specifically, the at least one opening, such as first opening 110, is drilled to the second diameter D2 during the same step as a second opening, such as second opening 122, is drilled in the mating second member, such as second member 104, at the second diameter D2. In one implementation, drilling 302 the at least one opening includes drilling 302 the at least one opening at the first diameter that is within a range of between 50 percent and 90 percent of the second diameter.

As described herein, the second diameter is the final desired size of the first and second openings and will receive a fastener, such as fastener 142, therethrough. The determinate assembly features on the first and second members facilitate aligning the first and second openings within a predetermined tolerance limit to ensure the chamfers survive the second drilling step 308. Specifically, the chamfers are formed at a chamfer diameter that is greater than the second diameter such that the chamfers are formed 304 for the final desired size of the first and second openings. Further, the predetermined tolerance limit of the determinate assembly features is less than the difference between the chamfer diameter and the second diameter. As such, even at the predetermined tolerance limit of the determine assembly features, the first and second openings at the second diameter are contained with the chamfer diameters. Accordingly, at least a portion of the chamfers on the first and second members remain in place after drilling 308 the first and second openings to the second diameter. The determinate assembly features facilitate aligning the chamfers of the first and second members such that any deviation in alignment is within the predetermined tolerance limit and is small enough to fall within the chamfer diameter.

In the implementation, the chamfers are formed 304 when the first and second openings are at the first diameter such that the chamfers are already in place when the first and second openings are drilled 308 to the second diameter. Forming 304 the chamfers at the chamfer diameter on the openings prior to drilling 308 the openings to the final, desired size at the second diameter allows for the drilling step 308 to occur within the chamfer and not at a sharp corner between the opening and a horizontal surface of the members. The chamfers "break" the corners of the openings to reduce or prevent the formation of burrs between the first and second members and therefore prevent the need to disassemble the first and second members after the final diameter is drilled to de-burr the openings.

In one implementation, method 300 also includes smoothing an edge, such as edge 144, defined between the chamfer and the at least one opening after drilling 210 the at least one opening to the second diameter. This step may be repeated at every edge between a chamfer and an opening.

The implementations described herein relate to a method of assembling an assembly of members, and, more particularly, to methods of forming chamfers and aligning members of an assembly. More specifically, in the exemplary implementation, the method includes drilling a plurality of openings through each member of an assembly, where each opening includes a first diameter. A chamfer is then formed at both ends of each opening and the members are positioned to align their respective openings using determinate assembly features that align the members within a predetermined tolerance limit. The method further includes drilling through each of the aligned openings at a second diameter that is larger than the first diameter. As described herein, the chamfers are formed at a diameter larger than the second diameter and the predetermined tolerance limit of the determinate assembly features is less than the difference between the chamfer diameter and the second diameter to ensure that the chamfers survive the second drilling step. Accordingly, the determinate assembly features facilitate aligning the chamfers of the assembly members such that any deviation in alignment is within the predetermined tolerance limit and is small enough to fall within the chamfer diameter.

Forming the chamfers at the chamfer diameter on the openings prior to drilling the openings to the final, desired size at the second diameter allows for the second drilling step to occur within the chamfer and not at a sharp corner between the openings and a horizontal surface of the members. As such, the chamfers "break" the corners of the openings to reduce or prevent the formation of burrs between the assembly members and therefore prevent the need to disassemble the first and second members after the final diameter is drilled to de-burr the openings. Elimination of the disassembly and de-burring steps significantly reduces manufacturing time and provides for costs savings.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an aircraft assembly including a first member and a second member, the method comprising:
   drilling at least one first opening through the first member, the at least one first opening having a first diameter;
   drilling at least one second opening through the second member, the at least one second opening having the first diameter;
   forming a chamfer on the at least one first opening and the at least one second opening, the chamfer having a chamfer diameter;
   positioning the first and second members using a plurality of determinate assembly features integrally formed on the first and second members to align the at least one first opening and the at least one second opening within a predetermined tolerance limit; and
   drilling the at least one first opening and the at least one second opening to a second diameter, wherein the second diameter is greater than the first diameter, and wherein the predetermined tolerance limit is less than a difference between the chamfer diameter and the second diameter.

2. The method of claim 1, wherein forming the chamfer comprises forming the chamfer on two opposing ends of each of the at least one first opening and the at least one second opening.

3. The method of claim 2, wherein forming the chamfer comprises forming the chamfer at a first end of each of the at least one first opening and the at least one second opening simultaneously when drilling the at least one first opening and the at least one second opening at the first diameter.

4. The method of claim 3, wherein forming the chamfer comprises forming the chamfer at a second end of each of the at least one first opening and the at least one second opening after forming the chamfer at the first end of each of the at least one first opening and the at least one second opening.

5. The method of claim 1, wherein the chamfer diameter is greater than the second diameter.

6. The method of claim 1, further comprising installing a fastener through the at least one first opening and the at least one second opening to secure the first member to the second member.

7. The method of claim 1, wherein drilling the at least one first opening and drilling the at least one second opening at the first diameter is performed before the positioning step, and wherein forming the chamfer on the at least one first opening and the at least one second opening is performed before the positioning step.

8. The method of claim 1, further comprising smoothing an edge defined between the chamfer and the at least one first opening after drilling the at least one opening at the second diameter.

9. The method of claim 1, wherein drilling the at least one first opening comprises drilling the at least one first opening at the first diameter that is within a range of between 50 percent and 90 percent of the second diameter.

10. The method of claim 1, wherein positioning the first and second members using the plurality of determinate assembly features comprises aligning a recess formed in the first member with a projection extending from the second member.

11. A method of forming chamfered holes [[m]] in an assembly, the method comprising:
   drilling at least one opening through a first member of the assembly, wherein the at least one opening is drilled at a first diameter;
   forming a chamfer about the at least one opening, wherein the chamfer is formed at a chamfer diameter;
   positioning the first member in alignment with a mating second member using a plurality of determinate assembly features integrally formed on at least one of the first and second members, wherein the first member and the mating second member are to be assembled relative to each other within a predetermined tolerance limit; and
   drilling the at least one opening in the first member and drilling the mating second member such that the at least one opening includes a second diameter greater than the first diameter, and wherein the predetermined tolerance limit is less than a difference between the chamfer diameter and the second diameter.

12. The method of claim 11, wherein the chamfer diameter is greater than the second diameter.

13. The method of claim 11, wherein drilling the at least one opening comprises drilling the at least one opening at the first diameter that is within a range of between 50 percent and 90 percent of the second diameter.

14. The method of claim 11, wherein drilling the at least one opening at the first diameter is performed before the positioning step, and wherein forming the chamfer on the at least one opening is performed before the positioning step.

15. The method of claim 11, wherein forming the chamfer comprises forming the chamfer on two opposing ends of the at least one opening.

16. The method of claim 11, further comprising smoothing an edge defined between the chamfer and the at least one opening after drilling the at least one opening at the second diameter.

17. The method of claim 11, wherein forming the chamfer comprises forming the chamfer at a first end of the at least one opening simultaneously when drilling the at least one opening and the second member at the first diameter.

18. The method of claim 11, further comprising installing a fastener through the at least one first opening and the second member to secure the first member to the second member.

19. The method of claim 11, wherein drilling the at least one opening and drilling the mating second member comprises drilling the at least one opening and the mating second member simultaneously.

20. The method of claim 11, wherein positioning the first member in alignment with the mating second member using the plurality of determinate assembly features comprises aligning a recess formed in the first member with a projection extending from the second member.

* * * * *

UNITED STATES PATENT AND TRADEMARK OFFICE
CERTIFICATE OF CORRECTION

| | | |
|---|---|---|
| PATENT NO. | : 11,213,897 B2 | Page 1 of 1 |
| APPLICATION NO. | : 16/423610 | |
| DATED | : January 4, 2022 | |
| INVENTOR(S) | : Mark Steven Denman | |

It is certified that error appears in the above-identified patent and that said Letters Patent is hereby corrected as shown below:

In the Claims

In Claim 11, Column 9, Line 17, delete "holes [[m]]" and insert therefor -- holes --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*